United States Patent
Lior et al.

(10) Patent No.: US 12,493,334 B2
(45) Date of Patent: Dec. 9, 2025

(54) IN-BAND TRANSFER OF POWER-CONSUMPTION ALLOCATIONS AMONG PROCESSING DEVICES

(71) Applicant: Mellanox Technologies, Ltd., Yokneam (IL)

(72) Inventors: Ayal Josef Lior, Kiryat Ono (IL); Ortal Bashan, Tel Aviv (IL); Alex Netes, Rehovot (IL); Amit Kazimirsky, Givat Shmuel (IL)

(73) Assignee: Mellanox Technologies, Ltd, Yokneam (IL)

( * ) Notice: Subject to any disclaimer, the term of this patent is extended or adjusted under 35 U.S.C. 154(b) by 66 days.

(21) Appl. No.: 18/413,089

(22) Filed: Jan. 16, 2024

(65) Prior Publication Data

US 2025/0231603 A1 Jul. 17, 2025

(51) Int. Cl.
 *G06F 1/26* (2006.01)
 *G06F 1/18* (2006.01)
 *G06F 9/50* (2006.01)
 *G06F 11/30* (2006.01)

(52) U.S. Cl.
 CPC ............. *G06F 1/26* (2013.01); *G06F 11/3062* (2013.01); *G06F 1/189* (2013.01); *G06F 1/266* (2013.01); *G06F 9/5094* (2013.01)

(58) Field of Classification Search
 CPC .......... G06F 1/26; G06F 1/266; G06F 9/5094; G06F 1/189; G06F 11/3062
 USPC .................................. 713/300, 310; 709/230
 See application file for complete search history.

(56) References Cited

U.S. PATENT DOCUMENTS

| | | | | |
|---|---|---|---|---|
| 2008/0263373 A1* | 10/2008 | Meier | ................... | G06F 9/3885 713/300 |
| 2009/0077407 A1* | 3/2009 | Akimoto | ................... | G06F 1/26 713/340 |
| 2013/0226362 A1* | 8/2013 | Jagadishprasad | ..... | G06F 1/3203 700/297 |
| 2014/0143558 A1* | 5/2014 | Kuesel | ...................... | G06F 1/26 713/300 |
| 2015/0338909 A1* | 11/2015 | Woodruff | ................ | G06F 1/325 713/323 |
| 2023/0236652 A1* | 7/2023 | Moshe | .................. | G06F 1/3203 713/320 |

OTHER PUBLICATIONS

Desai et al., U.S. Appl. No. 18/497,228, filed Oct. 30, 2023.

* cited by examiner

*Primary Examiner* — Ji H Bae
(74) *Attorney, Agent, or Firm* — Meitar Patents Ltd.; Daniel Kligler

(57) ABSTRACT

A power allocation method includes allocating power-consumption allocations to multiple processing devices. Available power allocations, which are offered for transfer to other processing devices, are reported by one or more over-allocated processing devices among the processing devices. Power demands, which are required by one or more under-allocated processing devices among the processing devices, are reported by the under-allocated processing devices. At least some of the available power allocations are transferred from one or more of the over-allocated processing devices to one or more of the under-allocated processing devices.

12 Claims, 2 Drawing Sheets

IN-BAND TRANSFER OF POWER-CONSUMPTION ALLOCATIONS AMONG PROCESSING DEVICES

FIELD OF THE INVENTION

The present invention relates generally to power management in computing systems, and particularly to methods and systems for transferring power-consumption allocations between processing devices.

BACKGROUND OF THE INVENTION

A typical computing system, such as a Data Center (DC) or a High-Performance Computing (HPC) cluster, comprises a large number of processing devices that communicate with one another over a data network. Processing devices may comprise, for example, servers, Graphics Processing Units (GPUs), network switches, etc.

The processing loads, and therefore the power consumptions, of the various processing devices often fluctuate considerably as a function of time. Allocating each processing device a fixed power allocation based on its maximal possible power consumption is highly sub-optimal, since power-consumption peaks of different processing devices rarely coincide.

SUMMARY OF THE INVENTION

An embodiment of the present invention that is described herein provides a power allocation method, including allocating power-consumption allocations to multiple processing devices. Available power allocations, which are offered for transfer to other processing devices, are reported by one or more over-allocated processing devices among the processing devices. Power demands, which are required by one or more under-allocated processing devices among the processing devices, are reported by the under-allocated processing devices. At least some of the available power allocations are transferred from one or more of the over-allocated processing devices to one or more of the under-allocated processing devices.

In some embodiments, reporting the available power allocations, reporting the power demands, and transferring the available power allocations, are performed periodically in preparation for subsequent processing intervals. In a disclosed embodiment, the method further includes returning a power allocation, which was transferred from a first processing device to a second processing device, back to the first processing device after a defined time period.

In some embodiments, reporting the available power allocations, reporting the power demands, and transferring the available power allocations, are performed by communicating using an in-band communication protocol among the processing devices. In an example embodiment, the processing devices are to communicate with one another using an InfiniBand (IB) protocol, and communicating using the in-band communication protocol includes exchanging Management Datagrams (MADs) among the processing devices.

In an embodiment, reporting the available power allocations and the power demands includes advertising the available power allocations and the power demands among the processing devices, and transferring the available power allocations includes applying a distributed power redistribution scheme by the processing devices. In an alternative embodiment, reporting the available power allocations and the power demands includes sending the available power allocations and the power demands to a central controller, and transferring the available power allocations includes instructing at least one of the over-allocated processing devices, by the central controller, to transfer at least part of a respective available power allocation to at least one of the under-allocated processing devices.

In a disclosed embodiment, the method further includes reporting, by one or more of the processing devices, respective actual power consumptions of the one or more of the processing devices, and transferring at least some of the available power allocations is performed depending on the actual power consumptions.

There is additionally provided, in accordance with an embodiment of the present invention, a system including multiple processing devices. The processing devices are to receive power-consumption allocations. One or more over-allocated processing devices among the processing devices are to report respective available power allocations that are offered for transfer to other processing devices. One or more under-allocated processing devices among the processing devices are to report respective power demands required by the under-allocated processing devices. One or more of the over-allocated processing devices are to transfer at least some of the available power allocations to one or more of the under-allocated processing devices.

The present invention will be more fully understood from the following detailed description of the embodiments thereof, taken together with the drawings in which:

DETAILED DESCRIPTION OF EMBODIMENTS

Overview

Figure 1:
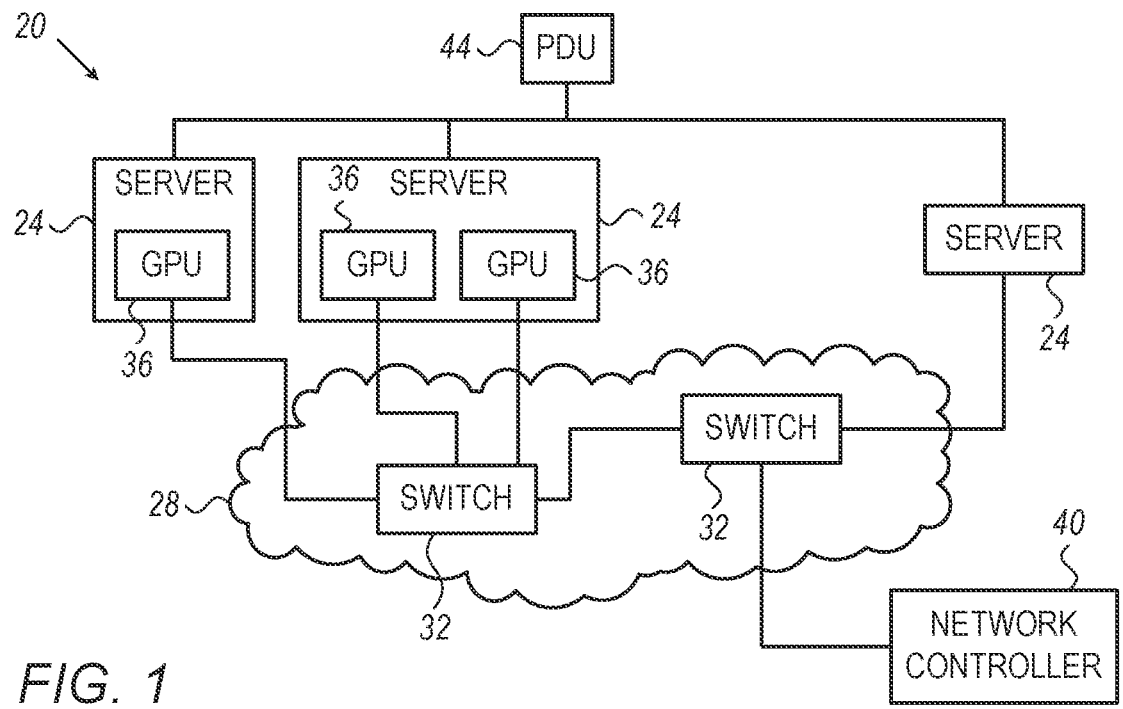
FIG. 1 is a block diagram that schematically illustrates a computing system employing transfer of power-consumption allocations between processing devices, in accordance with an embodiment of the present invention.

Embodiments of the present invention that are described herein provide improved methods and systems for power management in computing systems. The disclosed techniques adaptively transfer power-consumption allocations from over-allocated processing devices to under-allocated processing devices. The process of identifying over-allocated and under-allocated processing devices, and transferring power-consumption allocations between them, is typically performed continually, e.g., at periodic time intervals. As a result, the power-consumption allocations of the various processing devices vary over time to match the processing devices' actual requirements. In this manner, the overall power supply rating of the system is considerably smaller than the sum of maximal power consumptions of the processing devices.

In some embodiments described herein, a computing system comprises multiple processing devices that are powered by a Power Distribution Unit (PDU). The processing devices may comprise, for example, servers, GPUs, switches and/or other suitable devices. At any given time, each processing device is allocated a certain power-consumption allocation. The processing devices periodically evaluate their power requirements vs. their respective power-consumption allocations. In other words, each processing device assesses periodically whether it is over-allocated (i.e., has available power that can be transferred to other processing devices) or under-allocated (i.e., needs to receive an additional power-consumption allocation in order to meet its power requirement).

In preparation for an upcoming time interval (also referred to as a processing interval), each over-allocated processing device reports the available power allocation it is able to transfer to other processing devices. Each under-allocated processing device reports its power demand, i.e., the power-consumption it requests to receive from other processing devices.

The processing devices then reconcile the power-allocation demands and the available power allocations, by transferring available power-consumption allocations from one or more of the over-allocated processing devices to one or more of the under-allocated processing devices. Various allocation-transfer functions can be used for this purpose. In some embodiments, a processing device (over-allocated or under-allocated) also reports the actual average power it is currently consuming. The actual power consumptions of processing devices may also be a parameter in the allocation-transfer process or function.

In some embodiments, as part of normal operation of the system, the processing devices communicate with one another in accordance with a certain communication protocol, e.g., InfiniBand™ (IB) or Ethernet. The processing devices report the power-allocation demands and the available in-band power allocations using communication, i.e., using messages of the communication protocol being used for normal communication. In an IB system, for example, the processing devices may report the power-allocation demands and the available power allocations using IB Management Datagrams (MADs).

In some embodiments, the disclosed process is fully distributed. In these embodiments, each processing device advertises its power-allocation demand or available power allocation to all other processing devices. The transfer of power-consumption allocations is also carried out using a suitable distributed power redistribution scheme running in the processing devices.

In alternative embodiments, the disclosed process is centralized. In these embodiments, the processing devices send their power-allocation demands and available power allocations (typically in-band) to a central controller, e.g., a network controller. The central controller decides how to re-distribute the power-consumption allocations, and transfers available power-consumption allocations from one or more of the over-allocated processing devices to one or more of the under-allocated processing devices.

As can be appreciated, the methods and systems described herein enable considerable down-sizing of PDUs and other power supply components of the computing system. The disclosed techniques therefore enable significant reduction in computing system cost, size and heat dissipation. The disclosed solutions are particularly effective in applications in which the power consumptions of processing devices fluctuate considerably. Additionally or alternatively, when power consumptions change more slowly, the disclosed techniques can be used to gradually learn and adapt to the actual power-consumption requirements of the processing devices.

System Description

FIG. 1 is a block diagram that schematically illustrates a computing system 20, in accordance with an embodiment of the present invention. In the present example system 20 is a Data Center (DC). Generally, however, the disclosed techniques can be used in any suitable computing system. System 20 comprises multiple servers 24 that communicate with one another over an IB network 28. Network 28 comprises IB switches 32. One or more of servers 24 comprise Graphics Processing Units (GPUs) 36. System 20 is managed by a network controller 40 and powered by a Power Distribution Unit (PDU) 44.

In the present context, servers 24, switches 32 and GPUs 36 are referred to collectively as "processing devices". Generally, the system may comprise any other suitable types of processing devices. Additional examples of processing devices include Central Processing Units (CPUs), a blade hosting multiple GPUs, a blade hosting multiple switches, or any other suitable processing device.

Figure 2:
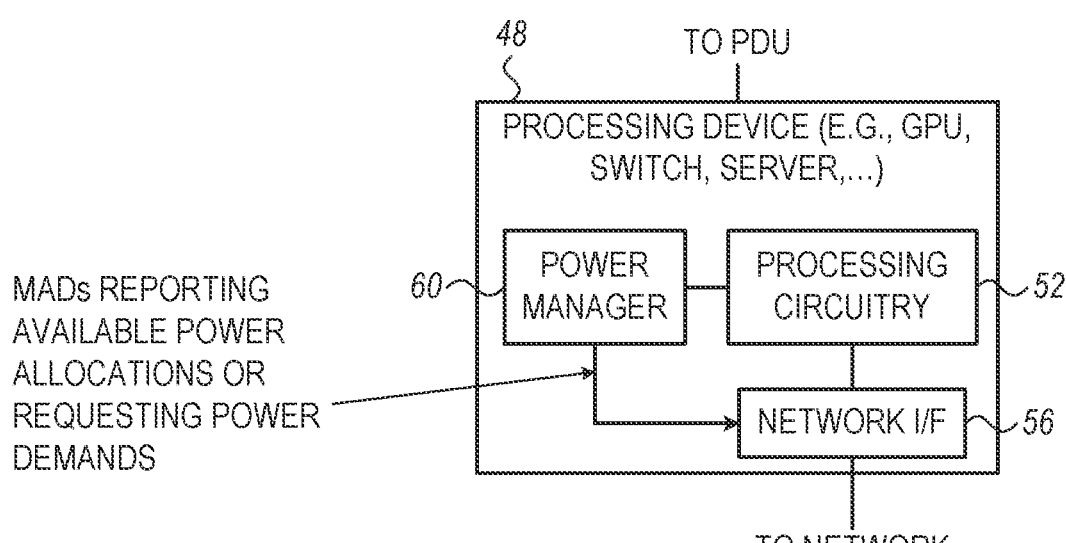
FIG. 2 is a block diagram that schematically illustrates a processing device in the computing system of FIG. 1, in accordance with an embodiment of the present invention.

FIG. 2 is a block diagram that schematically illustrates a processing device 48, in accordance with an embodiment of the present invention. Processing device 48 may comprise, for example, any of servers 24, switches 32 and GPUs 36 of system 20 of FIG. 1.

In the embodiment of FIG. 2, processing device 48 comprises processing circuitry 52 that carries out the various processing tasks of the processing device, a network interface (I/F) 56 for communicating over network 28, and a power manager 60 that carries out the power management processes described herein.

In particular, as will be elaborated below, power manager 60 sends and receives IB Management Datagrams (MADs) to and from other power managers 60 of other processing devices 48, and/or with network controller 40. For example, when processing device 48 is over-allocated with power, the MADs may report the available power allocation offered for transfer to other processing devices. When processing device 48 is under-allocated with power, the MADs may request power demands, to be received from other processing devices.

The configurations of system 20 and processing device 48, as shown in FIGS. 1 and 2, are example configurations that are chosen purely for the sake of conceptual clarity. In alternative embodiments, any other suitable configurations can be used. Network controller 40, for example, typically comprises a suitable network interface for communicating over network 28, and a suitable processor for performing the various tasks of the network controller. Elements that are not necessary for understanding the principles of the present invention have been omitted from the figures for clarity.

The various elements of system 20 and processing device 48 may be implemented in hardware, e.g., in one or more Application-Specific Integrated Circuits (ASICs) or FPGAs, in software, or using a combination of hardware and software elements. In some embodiments, Certain elements of system 20, e.g., some or all of processing circuitry 52, power manager 60 and/or a processor of network controller 40, may be implemented, in part or in full, using one or more general-purpose processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Adaptive In-Band Transfer of Power-Consumption Allocations

Figure 3:
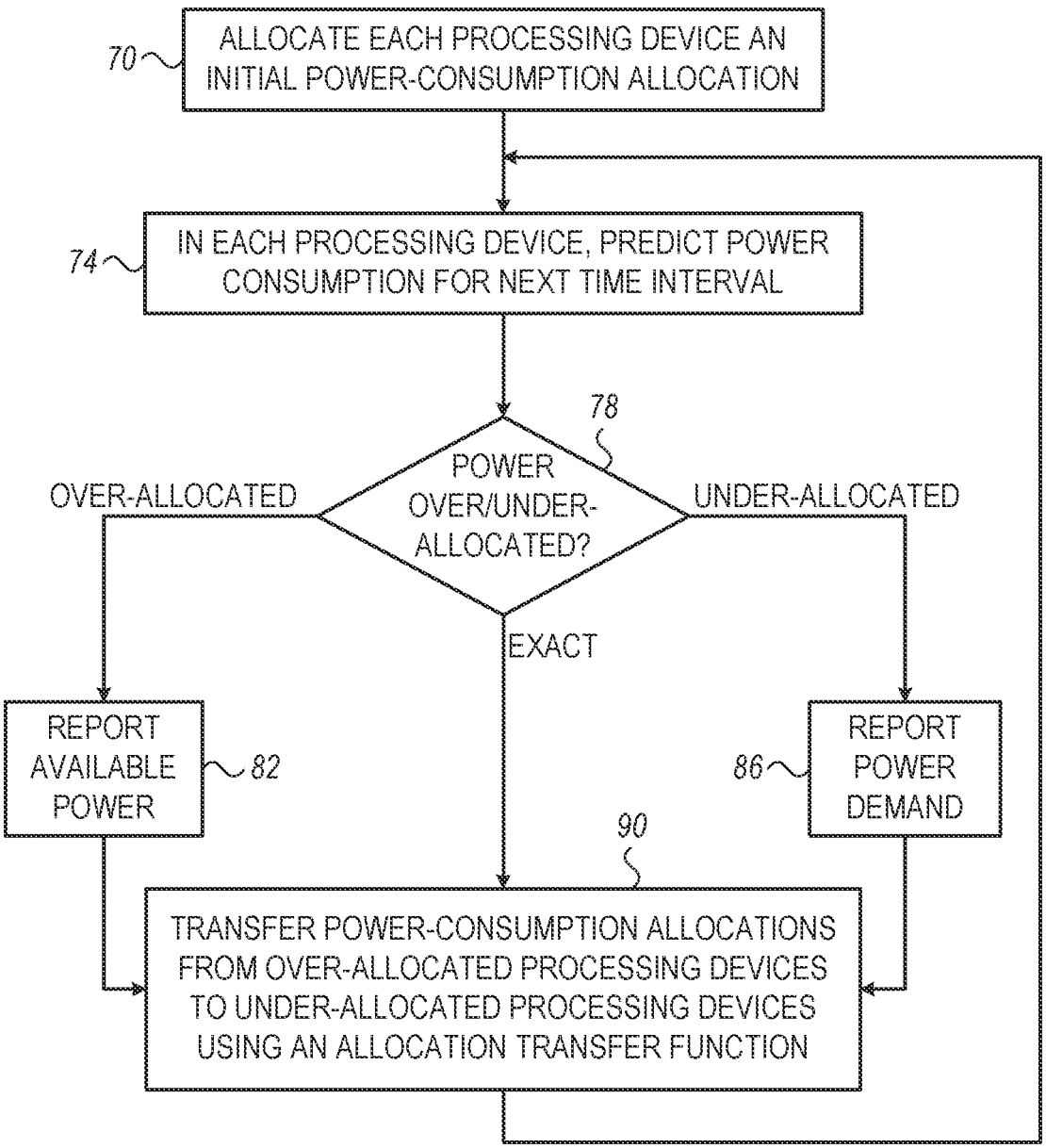
FIG. 3 is a flow chart that schematically illustrates a method for transferring power-consumption allocations between processing devices, in accordance with an embodiment of the present invention.

FIG. 3 is a flow chart that schematically illustrates a method for transferring power-consumption allocations between processing devices, in accordance with an embodiment of the present invention. The method of FIG. 3 may be carried out, for example, by the various processing devices 48 (e.g., servers 24, switches 32 and GPUs 36) of system 20. The method may be implemented in a centralized or distributed manner, as will be described below.

The method begins with network controller 40 allocating each processing device 48 a respective initial power-consumption allocation, at an initial allocation stage 70.

At a power-consumption prediction stage 74, power manager 60 of each processing device 48 predicts the amount of power that the processing device is expected to consume in the next processing interval. The estimate is typically derived from the type and amount of processing that processing circuitry 52 of the processing device expects to carry out in the next processing interval.

At a comparison stage 78, each power manager 60 compares the predicted power consumption to the power-consumption allocation that is currently allocated to the processing device 48. By making this comparison, the power manager decides whether the power-consumption allocation that is currently allocated to the processing device is exact, over-allocated or under-allocated.

If stage 78 concludes that the processing device is over-allocated for the next processing interval, power manager 60 sends a MAD that reports the available excess power allocation, at an available power reporting stage 82. This available excess power allocation is offered for transfer to other processing devices for the next processing interval.

If stage 78 concludes that the processing device is under-allocated for the next processing interval, power manager 60 sends a MAD that reports the amount of additional power needed by the processing device for the next processing interval, at a power demand reporting stage 86.

If stage 78 concludes that the existing power-consumption allocation is exact, no MAD is sent.

At an allocation transferal stage 90, at least some of the power-consumption allocations are transferred from one or more of the over-allocated processing devices to one or more of the under-allocated processing devices.

The allocation transfer process (whether centralized or distributed) may use an allocation-transfer function that specifies, for example, one or more of the following:

A selection of one or more over-allocated processing devices whose allocations are to be transferred, in full or in part.

A selection of one or more under-allocated processing devices to which power allocations are to be transferred, in full or in part.

A respective portion of the available power allocation to be deducted from each over-allocated processing device.

A respective portion of the power demand to be provided to each under-allocated processing device.

In some embodiments, the processing devices (whether over-allocated or under-allocated) also report the actual average powers they are currently consuming. This reporting is typically also performed in-band, e.g., using MADs.

The actual power consumption (e.g., an average over the current processing interval or over multiple processing intervals) may also be taken into account in deciding how to transfer power-consumption allocations from over-allocated processing devices to under-allocated processing devices.

The method then loops back to stage 74 above, to prepare for the next processing interval.

In an example embodiment, the size of each processing interval is on the order of 100 msec. A given power manager 60 may predict the power consumption for the next processing interval by averaging the expected power consumption over such an interval. In some embodiments, in predicting the power consumption for the next processing interval, power manager 60 may also consider the power consumptions over the present processing interval and/or previous processing intervals, e.g., using a moving average ("sliding window") function. Alternatively, any other suitable time constants and estimation schemes can be used.

As noted above, the method of FIG. 3 can be implemented in a centralized or in a distributed manner. In a typical centralized implementation, power managers 60 send the available power allocations (stage 82) and power-allocation demands (stage 86) to network controller 40. The network controller decides how to re-distribute the power-consumption allocations, and transfers available power-consumption allocations from one or more of the over-allocated processing devices to one or more of the under-allocated processing devices.

In a typical distributed implementation, each power manager 60 advertises its available power allocation (stage 82) or power-allocation demand (stage 86) so that this information is available to all other power managers 60 of all other processing devices. Based on the advertised available power allocations and power-allocation demands, one or more power managers of over-allocated processing devices transfer available power-consumption allocations to one or more power managers of under-allocated processing devices.

Any suitable distributed algorithm can be used for this purpose. In one example embodiment, each power manager 60 (or at least each power manager of a currently under-allocated processing device) receives the various MADs that report available power allocations. Based on these MADS, each power manager calculates the overall available power allocation across the system (e.g., the sum of the available power allocations offered by all the over-allocated processing devices in the system). In preparation for a given processing interval, each under-allocated power manager is permitted to take no more than a defined amount (or fraction) of the overall available power-consumption allocation.

In some embodiments, the transfer of a power-consumption allocation from one processing device to another is temporary, e.g., limited to a defined time period. After the time period expires, the power-consumption allocation is returned to the original processing device.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A power allocation method, the method comprising:
allocating power-consumption allocations to multiple processing devices;
advertising, by one or more over-allocated processing devices among the processing devices, respective available power allocations that are offered for transfer to other processing devices, such that the available power allocations are reported to one or more under-allocated processing devices among the processing devices;
advertising, by the one or more under-allocated processing devices, respective power demands required by the under-allocated processing devices, such that the power demands are reported to the one or more over-allocated processing devices;
based on the advertised available power allocations and power demands, updating the power-consumption allocations by transferring at least some of the available power allocations by at least one of the one or more over-allocated processing devices to at least one of the one or more under-allocated processing devices; and
supplying electrical power to the processing devices in accordance with the updated power-consumption allocations.

2. The method according to claim 1, wherein advertising the available power allocations, advertising the power demands, and transferring the available power allocations, are performed periodically in preparation for subsequent processing intervals.

3. The method according to claim 1, further comprising returning a power allocation, which was transferred from a first processing device to a second processing device, back to the first processing device after a defined time period.

4. The method according to claim 1, wherein advertising the available power allocations, advertising the power demands, and transferring the available power allocations, are performed by communicating using an in-band communication protocol among the processing devices.

5. The method according to claim 4, wherein the processing devices are configured to communicate with one another using an InfiniBand (IB) protocol, and wherein communicating using the in-band communication protocol comprises exchanging Management Datagrams (MADs) among the processing devices.

6. The method according to claim 1, further comprising reporting, by one or more of the processing devices, respective actual power consumptions of the one or more of the processing devices, wherein transferring at least some of the available power allocations is performed depending on the actual power consumptions.

7. A system comprising multiple processing devices and a Power Distribution Units (PDU), wherein:
the processing devices are configured to receive power-consumption allocations;
one or more over-allocated processing devices among the processing devices are configured to advertise respective available power allocations that are offered for transfer to other processing devices, such that the available power allocations are reported to one or more under-allocated processing devices among the processing devices;
the one or more under-allocated processing devices are configured to advertise respective power demands required by the under-allocated processing devices, such that the power demands are reported to the one or more over-allocated processing devices;
based on the advertised available power allocations and power demands, one or more of the over-allocated processing devices are configured to update the power-consumption allocations by transferring transfer at least some of the available power allocations to at least one of the one or more under-allocated processing devices; and
the PDU is configured to supply electrical power to the processing devices in accordance with the updated power-consumption allocations.

8. The system according to claim 7, wherein the processing devices are configured to advertise the available power allocations, advertise the power demands, and transfer the available power allocations, periodically in preparation for subsequent processing intervals.

9. The system according to claim 7, wherein the processing devices are configured to return a power allocation, which was transferred from a first processing device to a second processing device, back to the first processing device after a defined time period.

10. The system according to claim 7, wherein the processing devices are configured to advertise the available power allocations, advertise the power demands, and transfer the available power allocations, by communicating with one another using an in-band communication protocol.

11. The system according to claim 10, wherein the processing devices are configured to communicate with one another using an InfiniBand (IB) protocol, and wherein the in-band communication protocol comprises Management Datagrams (MADs).

12. The system according to claim 7, wherein one or more of the processing devices are further configured to report respective actual power consumptions of the one or more of the processing devices, and wherein the processing devices are to configured transfer at least some of the available power allocations depending on the actual power consumptions.

* * * * *